US006927930B1

(12) United States Patent
Dunn et al.

(10) Patent No.: US 6,927,930 B1
(45) Date of Patent: Aug. 9, 2005

(54) ADAPTIVE DATA FORMAT METHOD INTEGRATING SPARE SECTORS

(75) Inventors: George Anthony Dunn, San Jose, CA (US); Daniel J. Malone, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/775,269

(22) Filed: Feb. 10, 2004

(51) Int. Cl.$^7$ ................................................ G11B 5/09
(52) U.S. Cl. ........................ 360/48; 360/73.03; 360/53
(58) Field of Search ............................. 360/48, 47, 50, 360/53, 73.03

(56) References Cited

U.S. PATENT DOCUMENTS

| | | | | |
|---|---|---|---|---|
| 5,596,458 A | * | 1/1997 | Emo et al. ..................... | 360/48 |
| 6,061,195 A | * | 5/2000 | Wilson et al. ................. | 360/48 |
| 6,466,387 B1 | * | 10/2002 | Ogasawara et al. ........... | 360/48 |

FOREIGN PATENT DOCUMENTS

| | | | | |
|---|---|---|---|---|
| JP | 2001184800 A | * | 7/2001 | ........... G11B 20/12 |
| JP | 2001184800 A2 | | 7/2001 | |
| WO | WO 00/01146 | | 1/2000 | |

* cited by examiner

*Primary Examiner*—David Hudspeth
*Assistant Examiner*—Dismery Mercedes
(74) *Attorney, Agent, or Firm*—Joseph P. Curtin

(57) ABSTRACT

The performance capability of different heads that are part of the same hard disk drive (HDD) are utilized by an adaptive format that includes a plurality of storage zones and at least one reset zone that are distributed along a radius of the hard disk such that a reset zone is disposed between two adjacent storage zones. Each storage zone has a plurality of associated data tracks and each reset zone includes a plurality of data tracks. The number of data tracks associated with each respective storage zone is based on a performance capability of a head associated with the hard disk and includes at least one data track of at least one reset zone adjacent to the storage zone when the number of data tracks associated with the storage zone exceeds the number of data tracks that are between each reset zone adjacent to the storage zone.

18 Claims, 4 Drawing Sheets

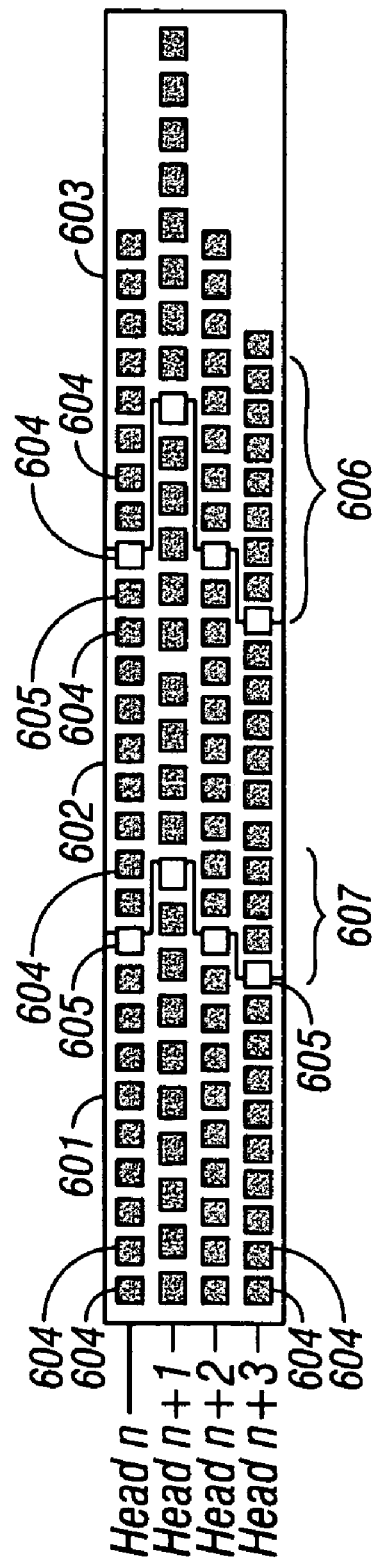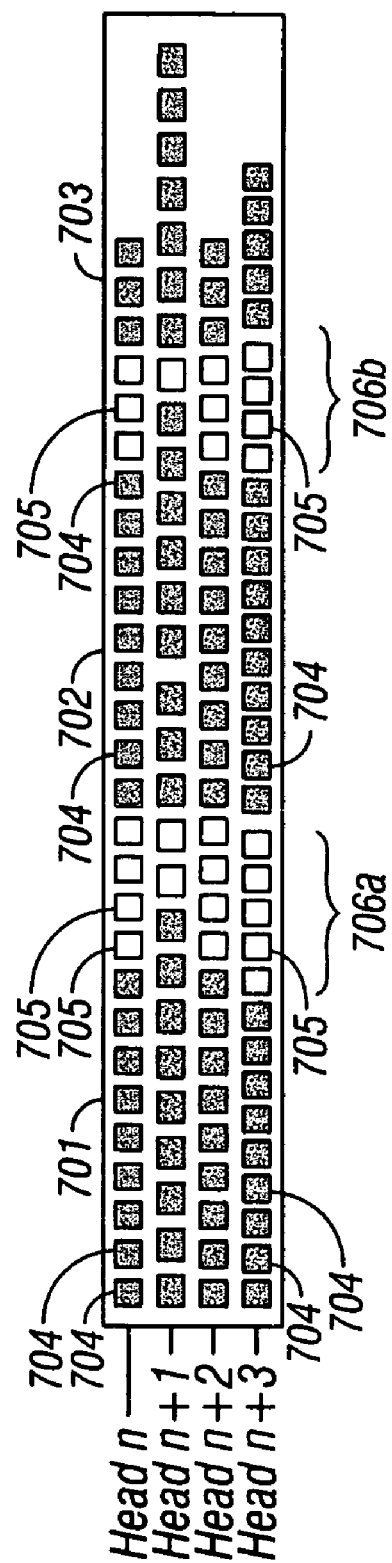

ADAPTIVE DATA FORMAT METHOD INTEGRATING SPARE SECTORS

BACKGROUND OF THE INVENTION

1. Field of the Invention

The present invention relates to hard disk drives (HDDs). More particularly, the present invention relates to an adaptive format that takes advantage of the performance capability of different heads that are part of the same HDD.

2. Description of the Related Art

FIG. 1 shows an exemplary high-RPM hard disk drive (HDD) 100 having at least one magnetic read/write head (or a recording slider) 101 and at least one magnetic disk 102. Each magnetic read/write head 101 includes, for example, a tunnel-valve read sensor, that is positioned over a selected track on a magnetic disk 102 using, for example, a two-stage servo system for reading data stored on disk 102. The two-stage servo system includes a voice-coil motor (VCM) 104 for coarse positioning a read/write head suspension 105 and may include a microactuator, or micropositioner, for fine positioning a read/write head 101 over the selected track. As used herein, a microactuator (or a micropositioner) is a small actuator that is placed between a suspension and a slider, and moves the slider relative to the suspension.

Adaptive format techniques are well known for modifying the structure of customer data on each magnetic disk 102 of HDD 100 to compensate for the radial position on each disk and for the bits-per-inch (BPI) performance capability of each head. Nevertheless, the complexity of implementation of conventional adaptive formats has caused only a small percentage of HDDs in the marketplace use an adaptive format technique.

FIG. 2 shows a graph 200 representing the relative BPI of storage as a function of position along the radius of a hard disk for a conventional standard adaptive format. The abscissa of graph 200 is the position along the radius of a disk, with the Inside Diameter (ID) of a disk shown on the left and the Outside Diameter (OD) of the disk shown on the right. The left ordinate of graph 200 is the relative BPI of storage and the right ordinate of graph 200 is the relative data rate in MB/S. Curve 201 represents the data rate as a function of position along the radius of an exemplary hard disk. Because the circumference is greater at the outer diameter of the disk relative to the inner diameter, the data rate at the outer diameter of the disk corresponds to a greater number of bits of data for a single complete revolution of the disk. The data rate and the number of data bits per revolution are reduced in discrete steps represented by curve 201. Curve 202 represents the actual bits per inch as a function of position along the radius of the exemplary hard disk. Curve 202 shows that the actual bits per inch increases as the radius decreases until the number of data bits per revolution steps to a different value, as represented by curve 201. Curve 203 represents what is commonly referred to as the profile of the head BPI capability and is based on curve 202.

FIG. 3 depicts the arrangement of a conventional standard adaptive format on an HDD for four heads, indicated as heads n through n+3. Storage zones 301–303 represent three adjacent portions of hard disks. Storage zone 301 is positioned along the radius of a disk as the closest of the three storage zones to the OD of the disk. Accordingly, storage zone 303 is positioned along the radius of the disk as the closest of the three storage zones to the ID of the disk. Each storage zone 301–303 includes a plurality of tracks 304 and each storage zone 301–303 is separated from each adjacent storage zone by unused or blank tracks 305. As can be seen in FIG. 3, the storage zones for each head changes at the same position in the radius of the hard disk. That is, all of the storage zones are aligned with the tracks and with each other.

Although storage zones 301–303 are each depicted as being about the same size in FIG. 3, it should be understood that the storage zones do not necessarily need to be the same size. For example, storage zone 301 could, for example, correspond to the portion of curve 201 indicated as 204; zone 302 could correspond to the portion of curve 201 indicated as 205; and zone 303 could correspond to the portion of curve 201 indicated as 206. Additionally, while each storage zone shows the tracks associated with four heads grouped together, it should be understood that the tracks associated with each respective head can be physically associated on different hard disks. Further still, while FIGS. 2 and 3 depict a conventional standard format technique on a BPI by head basis, conventional standard adaptive format techniques on a tracks-per-inch (TPI) by head basis are also well-known and can be depicted by both FIGS. 2 and 3.

FIG. 4 shows a graph 400 representing the performance capability distribution of an exemplary plurality of read/write heads with respect to the conventional adaptive format technique represented in FIGS. 2 and 3. Portion 401 of graph 400 represents the portion (a 4 to 5 σ level) of read/write heads that do not have the performance capability to meet the profile represented by curve 203 in FIG. 2. Typically, the mean performance capability 402 of the read/write heads exceeds the performance capability profile.

FIG. 5 shows a graph 500 contrasting the relative BPI performance capability of two exemplary read/write heads, such as heads n and n+1 in FIG. 3, as a function of position along the radius of a hard disk for the standard format technique depicted by FIG. 3. The abscissa of graph 500 is the radius of a disk, with the ID of a disk shown on the left and the OD of the disk shown on the right. The left ordinate of graph 500 is the relative BPI and the right ordinate of graph 500 is the relative data rate in MB/S. Curve 501 represents the data rate as a function of position along the radius of an exemplary hard disk for head n. Curve 503 represents the relative BPI performance capability for head n, which, for this example, has a relatively high BPI performance capability, that is, a performance capability that would be located on the right side of graph 400. Curve 502 represents the data rate as a function of position along the radius of an exemplary hard disk for head n+1. Curve 504 represents the relative BPI performance capability for head n+1, which has a relatively low BPI performance capability, that is, a performance capability that would be located on the left side of graph 400. Because head n is a relatively higher performance head, a portion of curve 503 is at the highest BPI in comparison to curve 504 for head n+1. Nevertheless, because the two heads are part of the same HDD, they are each used to the minimum design BPI performance capability corresponding to curve 400 to the right of portion 401. Moreover, the relatively-higher BPI performance capability of head n is simply not utilized. Curve 505 represents the limit of the bits per inch curve 503 that was conventionally utilized.

One conventional approach to take advantage of the variations in BPI performance capability of different heads is to use a variable-zone-by-head adaptive format technique on a TPI by head or by BPI by head basis. FIG. 6 depicts the arrangement of a conventional variable-zone-by-head adaptive format on an HDD for four heads, indicated as heads n through n+3. Storage zones 601–603 represent three adjacent portions of a hard disk. Storage zone 601 is positioned along the radius of a disk as the closest of the three storage zones to the OD of the disk. Accordingly, storage zone 603 is positioned along the radius of the disk as the closest of the three storage zones to the ID of the disk. Each storage zone 601–603 includes a plurality of tracks 604 and each storage zone 601–603 is separated from each adjacent storage zone by unused or blank tracks 605. Additionally, while each storage zone shows the tracks associated with four heads grouped together, it should be understood that the tracks associated with each respective head are physically associated with different hard disks. Further still, while FIG. 6 depicts a conventional variable-zone-by-head adaptive format technique on a BPI by head basis, conventional variable-zone-by-head adaptive format techniques on a-TPI by head basis are also well-known and can be depicted by FIG. 6.

A conventional variable-zone-by-head adaptive format can be characterized by zones that vary by the BPI performance capability of the corresponding head. For example, as shown in FIG. 6, head n+3 has a higher BPI performance capability than heads n, n+1 and n+2. Thus, storage zone 601 for head n+3 extends less toward the ID of the disk than the corresponding storage zone for each of heads n, n+1 and n+2. As should be readily observable, there is a significant creep in the alignment of the storage zones and the data sectors that can occur with variable-zone-by-head adaptive format that degrades performance. For example, the creep between storage zones 602 and 603, represented by 606, is greater than the creep between storage zones 601 and 602, represented by 607.

Continued market pressures to increase areal densities of HDDs and the slowing of the read/write technology to achieve continued increased areal densities, new adaptive format techniques are needed.

Consequently, what is needed is an adaptive format technique that takes advantage of the performance capability of different heads that are part of the same HDD and that is not utilized by a conventional standard format technique. What is also needed is an adaptive format that does not have the disadvantage of creep exhibited by a conventional variable-zone-by-head adaptive format.

BRIEF SUMMARY OF THE INVENTION

The present invention provides a simplified adaptive format technique that takes advantage of the capability performance of different heads that are part of the same HDD and that is not utilized by a conventional standard format technique. Additionally, the adaptive format of the present invention does not suffer from the disadvantage of creep exhibited by a conventional variable-zone-by-head adaptive format.

The advantages of the present invention are provided by an adaptive format for a hard disk of a hard disk drive that includes a plurality of storage zones and at least one reset zone. The storage zones and each reset zone are distributed along a radius of the hard disk with a reset zone being disposed between two adjacent storage zones. Each storage zone has a plurality of associated data tracks and each reset zone includes a plurality of data tracks. The number of data tracks associated with each respective storage zone is based on a performance capability of a head associated with the hard disk. The number of tracks associated with each respective reset zone is based on predetermined allowed track creep and performance requirements for the hard disk drive. According to the invention, the performance capability of the head can be a tracks-per-inch performance capability and/or a bits-per-inch performance capability of the head.

The present invention also provides a hard disk drive having at least one head, and a hard disk associated with each head. The hard disk has a plurality of storage zones and at least one reset zone. The storage zones and each reset zone are distributed along a radius of a hard disk with a reset zone being disposed between two adjacent storage zones. Each storage zone has a plurality of associated data tracks and each reset zone includes a plurality of data tracks. The number of data tracks associated with each respective storage zone is based on a performance capability of a head associated with the hard disk and includes at least one data track of at least one reset zone that is adjacent to the storage zone when the number of data tracks associated with the storage zone exceeds a number of data tracks that are between each reset zone. A plurality of adjacent storage zones can have the same tracks-per-inch storage capability and/or the same bits-per-inch storage capability. According to the invention, the performance capability of the head can be a tracks-per-inch performance capability and/or a bits-per-inch performance capability of the head.

BRIEF DESCRIPTION OF THE DRAWINGS

The present invention is illustrated by way of example and not by limitation in the accompanying figures in which like reference numerals indicate similar elements and in which:

FIG. 6 depicts the arrangement of a conventional variable-zone-by-head adaptive format on an HDD for four heads, indicated as heads n through n+3;

FIG. 7 depicts an exemplary arrangement of a simplified adaptive format technique according to the present invention, referred to herein as a "reset-on-the-zone" adaptive format.

DETAILED DESCRIPTION OF THE INVENTION

Figure 1:
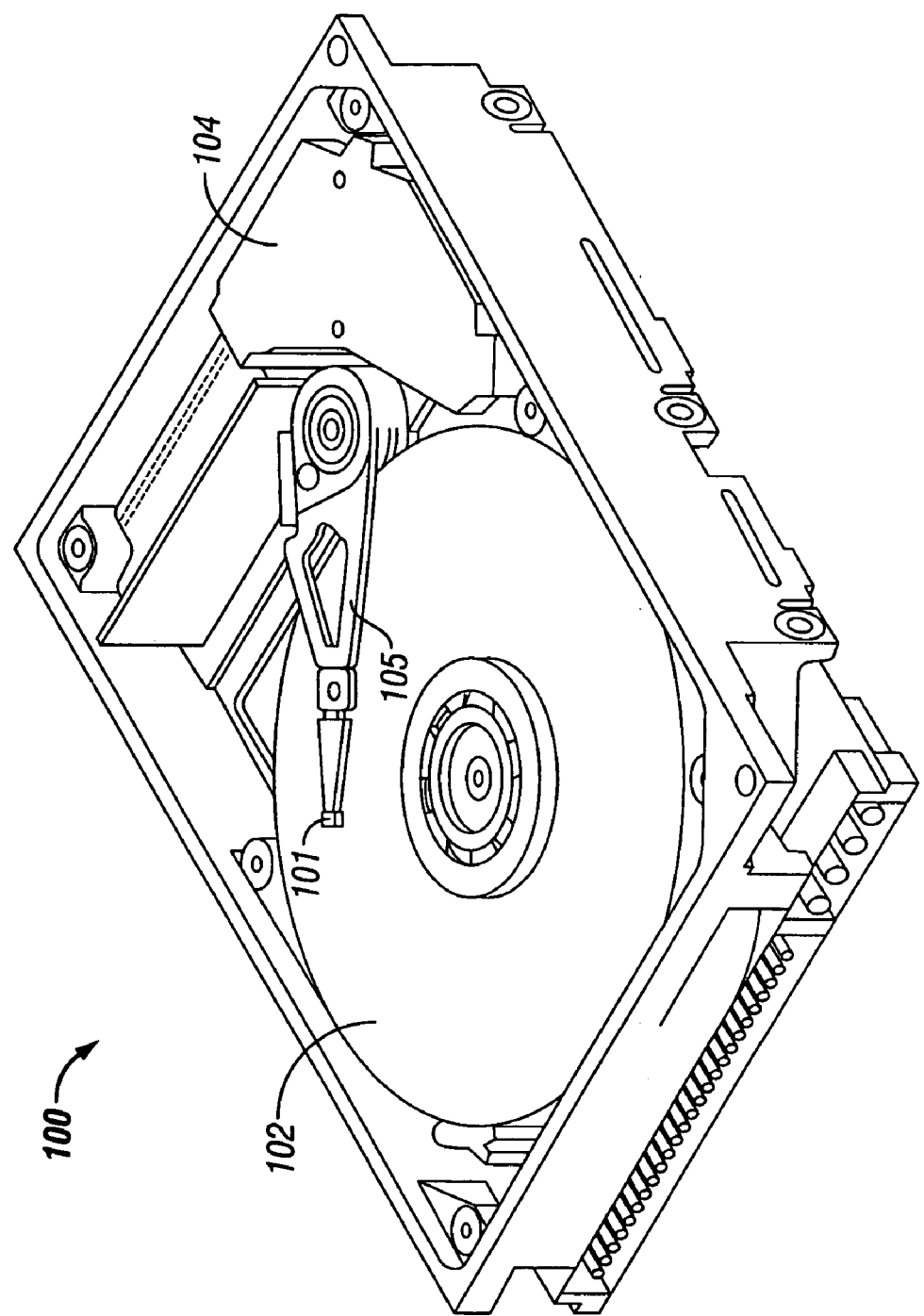
FIG. 1 shows an exemplary high-RPM disk drive having a magnetic read/write head.
Figure 2:
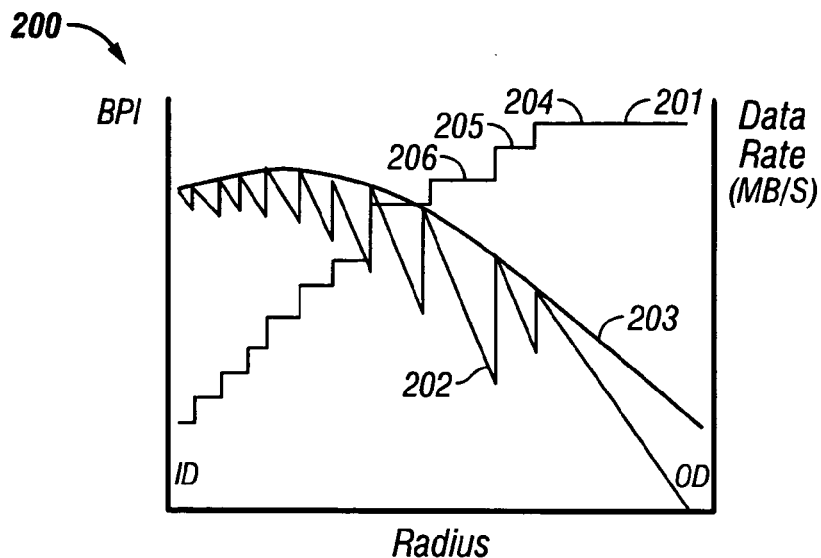
FIG. 2 shows a graph representing the relative BPI of storage as a function of position along the radius of a hard disk for a conventional standard format.
Figure 3:
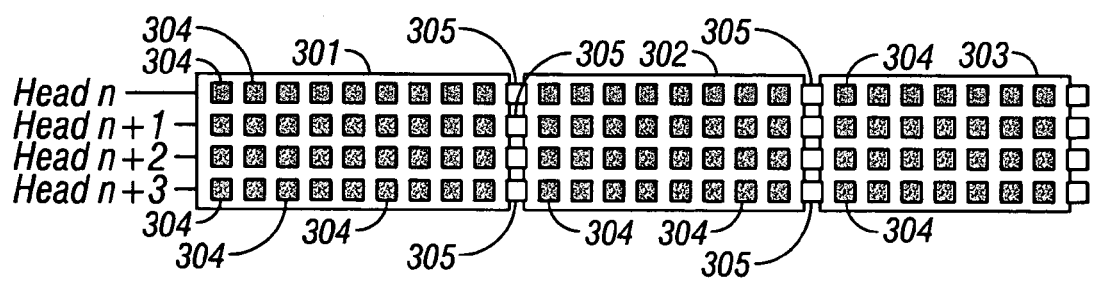
FIG. 3 depicts the arrangement of a conventional standard format on an HDD for four heads, indicated as heads n through n+3.
Figure 4:
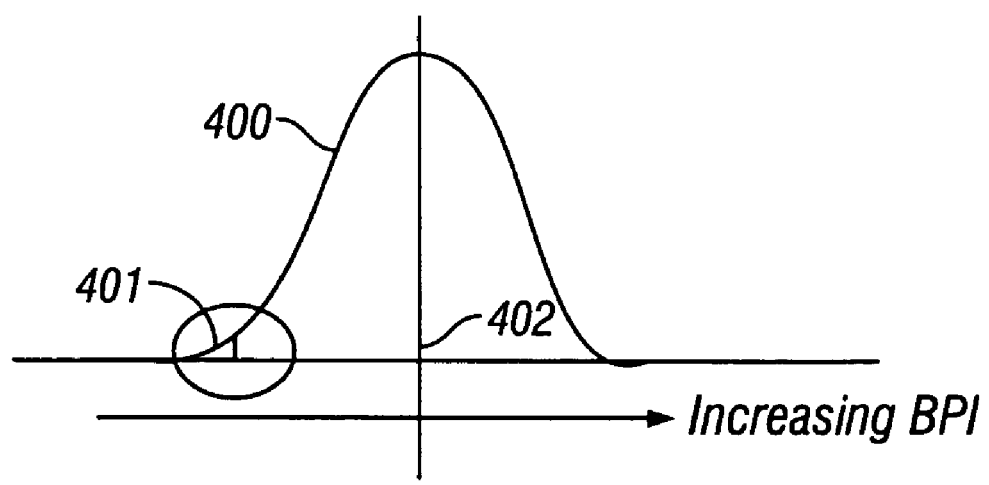
FIG. 4 shows a graph representing the performance capability distribution of an exemplary plurality of read/write heads with respect to the conventional format technique represented in FIGS. 2 and 3.
Figure 5:
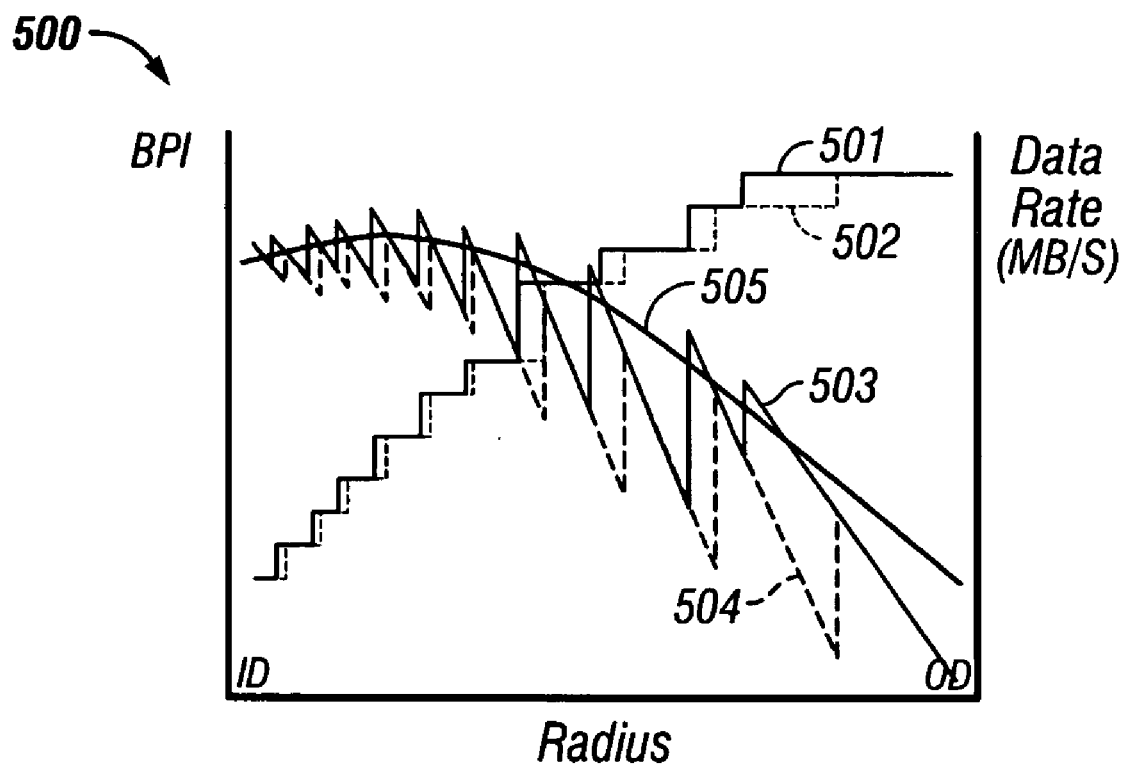
FIG. 5 shows a graph contrasting the relative BPI performance of two exemplary read/write heads as a function of position along the radius of a hard disk for the adaptive format technique depicted by FIG. 3.

The present invention provides a simplified adaptive format technique that takes advantage of the performance capability of different heads that are part of the same HDD and that is not utilized by a conventional standard format technique. Moreover, the adaptive format of the present invention does not suffer from the disadvantage of creep exhibited by a conventional variable-zone-by-head adaptive format. In this regard, the adaptive format of the present invention allows for either the bits-per-inch or the tracks-per-inch or both at a given point along the radius of a hard disk to be different for different heads on the same HDD. Additionally, the adaptive format of the present invention allows unused blocks to be assigned, thereby further increasing the overall performance of an HDD.

FIG. 7 depicts an exemplary arrangement of a simplified adaptive format technique on a hard disk drive for four heads, indicated as heads n through n+3. As referred to herein, the adaptive format of the present invention is referred to as a "reset-on-the-zone" adaptive format. Storage zones 701–703 shown in FIG. 7 represent three adjacent portions of a hard disk. Storage zone 701 is positioned along the radius of a disk as the closest of the three storage zones to the OD of the disk. Accordingly, storage zone 703 is positioned along the radius of the disk as the closest of the three storage zones to the ID of the disk. Each storage zone 701–703 includes a plurality of tracks 704 and each storage zone 701–703 is separated from each adjacent zone by unused or blank tracks 705. Adjacent storage zones can have the same BPI based on the BPI capability of the respective heads. For example, each of zones 701–703 can have the same BPI recording density. Alternatively, storage zones 701 and 702 can have the same BPI storage density and storage zone 703 can have a lesser BPI storage density. While each storage zone shows the tracks associated with four heads grouped together, it should be understood that the tracks associated with each respective head can be physically associated with different hard disks.

The reset-on-the-zone adaptive format of the present invention allows the BPI and/or the TPI to be different for each head for a given position along the radius of a hard disk. For example, as shown in FIG. 7, head n+3 has a higher BPI performance capability than heads n, n+1 and n+2. Further, the BPI performance capability of heads n and n+2 are about the same, but are both greater than the BPI performance capability of head n+1. Thus, storage zone 701 for head n+3 having the highest BPI performance capability extends the least distance toward the ID of the disk than the corresponding storage zone for each of heads n, n+1 and n+2. Storage zone 701 for heads n and n+2 extend about the same distance toward the ID of the disk. Storage zone 701 for head n+1 extends the greatest distance toward the ID of the disk. Alternatively, the performance capability of each head with respect to each zone could be based on a TPI performance capability of the head. As yet another alternative, the performance capability of each head with respect to each zone could be based on both a BPI and a TPI performance capability of the head.

The present invention also includes reset zones 706 that are positioned at regular intervals across the radius of a disk and that span a short distance, typically four to five tracks wide. The distance a storage zone for a particular head extends into a particular reset zone can differ from head to head. For example, zone 701 for head n+1 extends into reset zone 706a toward the ID of the disk to the greatest number of tracks. Similarly, zone 702 for each of heads n, n+2 and n+3 extend into reset zone 706b toward the ID of the disk to a lesser number of tracks. Additionally, a region of a hard disk designated to have a predetermined BPI storage density and/or data rate can have a plurality of storage zones and a plurality of reset zones.

Depending upon the number of defects found during the manufacturing process, however, the difference in the number of tracks that a storage zone extends into a reset zone could change or even reverse, that is, extend into a reset zone toward the OD of the hard disk. Tracks 705 within a reset zone 706 can be used as buffer sectors for defective sites and/or for spares in the field, thereby minimizing the number of wasted storage space.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An adaptive format for a hard disk of a hard disk drive, the adaptive format comprising a plurality of storage zones and a plurality of reset zones alternatingly distributed along the radius of a hard disk, each reset zone being separated by a first predetermined number of data tracks and containing a second predetermined number of data tracks, and each storage zone including a number of data tracks that is based on a performance capability of a head associated with the hard disk and overlapping at least one reset zone that is adjacent to the storage zone when the number of data tracks of the storage zone exceeds the first number of data tracks separating consecutive reset zones.

2. The adaptive format according to claim 1, wherein the performance capability of the head is a tracks-per-inch performance capability of the head.

3. The adaptive format according to claim 1, wherein the performance capability of the head is a bit-per-inch performance capability of the head.

4. The adaptive format according to claim 3, wherein the performance capability of the head is further based on a tracks-per-inch performance capability of the head.

5. The adaptive format according to claim 1, wherein a plurality of adjacent storage zones have the same bits-per-inch storage capability.

6. The adaptive format according to claim 1, wherein a plurality of adjacent storage zones have the same tracks-per-inch storage capability.

7. The adaptive format according to claim 6, wherein a plurality of adjacent storage zones further have the same bits-per-inch storage capability.

8. The adaptive format according to claim 1, wherein a number of tracks associated with each respective reset zone is based on predetermined allowed track creep for the hard disk drive.

9. The adaptive format according to claim 8, wherein the number of tracks associated with each respective reset zone is further based on a performance requirement for the hard disk drive.

10. A hard disk drive, comprising:
at least one head; and
a hard disk associated with each head, the hard disk having a plurality of storage zones and a plurality of reset zones alternatingly distributed along the radius of a hard disk, each reset zone being separated by a first predetermined number of data tracks and containing a second predetermined number of data tracks, and each storage zone including a number of data tracks that is based on a performance capability of a head associated with the hard disk and overlapping at least one reset zone that is adjacent to the storage zone when the number of data tracks of the storage zone exceeds the first number of data tracks separating consecutive reset zones.

11. The hard disk drive according to claim 10, wherein the performance capability of at least one head is a tracks-per-inch performance capability of the head.

12. The hard disk according to claim 10, wherein the performance capability of at least one head is a bit-per-inch performance capability of the head.

13. The hard disk drive according to claim 12, wherein the performance capability of at least one head is further based on a tracks-per-inch performance capability of the head.

14. The hard disk drive according to claim 10, wherein a plurality of adjacent storage zones have the same bits-per-inch storage capability.

15. The hard disk drive according to claim 10, wherein a plurality of adjacent storage zones have the same tracks-per-inch storage capability.

16. The hard disk drive according to claim 15, wherein a plurality of adjacent storage zones further have the same bits-per-inch storage capability.

17. The hard disk drive according to claim 10, wherein a number of tracks associated with each respective reset zone is based on predetermined allowed track creep for the hard disk drive.

18. The hard disk drive according to claim 17, wherein the number of tracks associated with each respective reset zone is further based on a performance requirement for the hard disk drive.

* * * * *